United States Patent

White et al.

[11] 4,177,684
[45] Dec. 11, 1979

[54] ANGULARLY ADJUSTABLE MOUNTING FOR SPROCKET WHEELS AND THE LIKE

[75] Inventors: Allen A. White, Peabody; Thomas W. Ankenman, Hesston, both of Kans.

[73] Assignee: Hesston Corporation, Hesston, Kans.

[21] Appl. No.: 823,230

[22] Filed: Aug. 10, 1977

[51] Int. Cl.² .............................................. F16H 13/10
[52] U.S. Cl. ........................................ 74/212; 74/242
[58] Field of Search ................. 74/659, 665 GE, 211, 74/212, 213, 242, 42

[56] References Cited

U.S. PATENT DOCUMENTS

| 1,189,336 | 7/1916 | Armstrong | 74/211 |
| 2,960,278 | 11/1960 | Roubal | 74/42 |
| 3,306,120 | 2/1967 | Kratzsch, Jr. | 74/211 |
| 3,399,582 | 9/1968 | Henry | 74/211 |

Primary Examiner—Samuel Scott
Assistant Examiner—Wesley S. Ratliff, Jr.
Attorney, Agent, or Firm—Schmidt, Johnson, Hovey & Williams

[57] ABSTRACT

The angular or rotative position of a sprocket wheel may be incrementally adjusted through the appropriate manipulation of a pair of spaced-apart, opposed wedge assemblies mounted on the wheel that capture a crank of the shaft so that by inching the crank in one rotative direction or the other through manipulation of the wedge assemblies, the rotative relationship between the wheel and the shaft is changed. Each wedge assembly includes a pair of relatively shiftable components having interengaging cam surfaces, one of such components having an arcuate surface that is received in slidable, mating engagement by a complementally formed recess on the proximal side of the crank, thereby permitting relative rotational movement between the crank and the wedge assemblies so as to accommodate the swinging or arcuate nature of the crank movement during adjustment.

9 Claims, 4 Drawing Figures

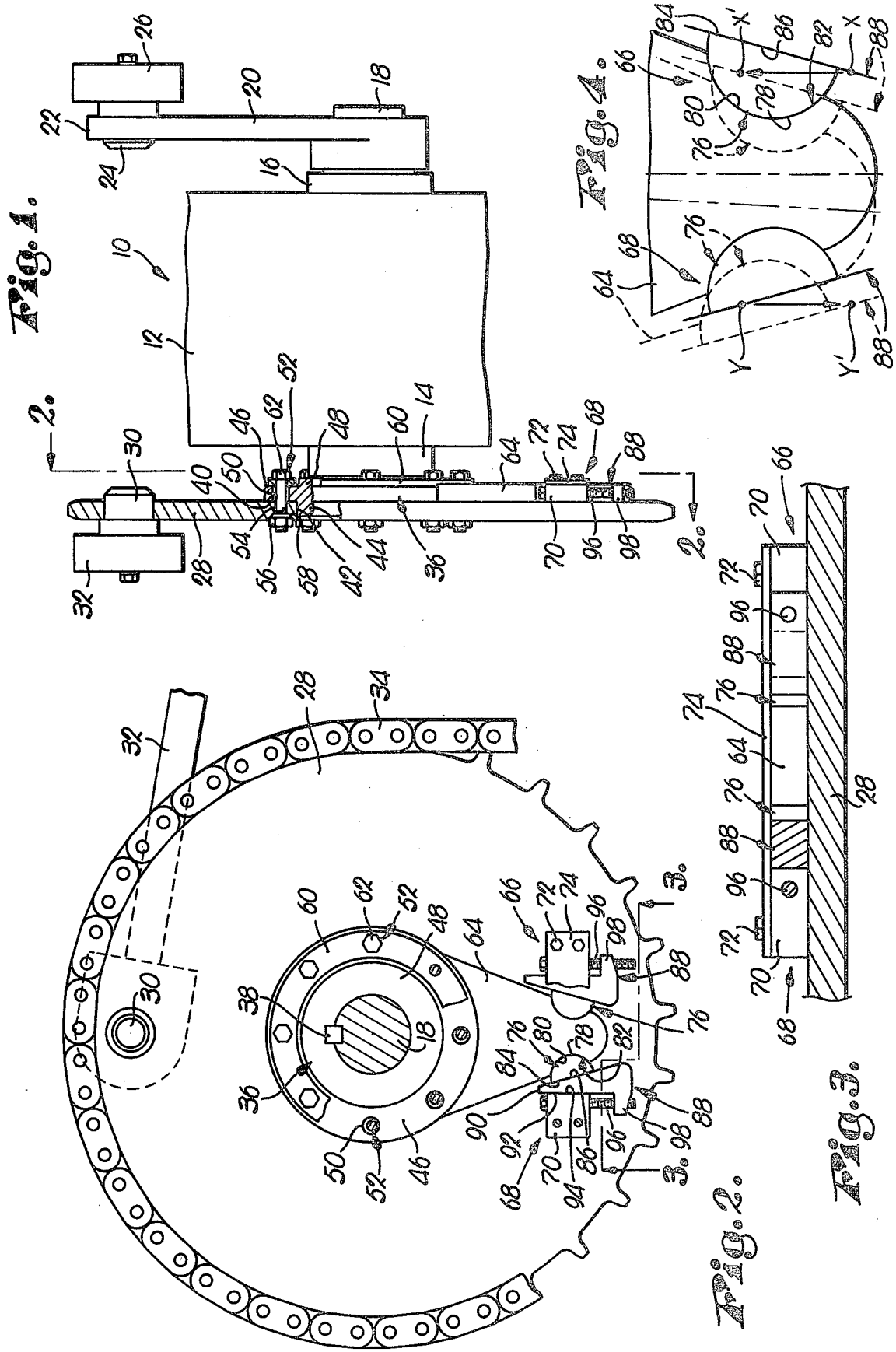

ANGULARLY ADJUSTABLE MOUNTING FOR SPROCKET WHEELS AND THE LIKE

This invention relates to the way in which sprocket wheels, gears, and the like are attached to shafts by which they are driven or which they drive, and, more particularly, relates to a way of permitting fine adjustment of the rotative position of such members once attached to such shafts.

In a power train, it is frequently quite important to have the components at opposite ends of the train positioned very accurately with respect to one another for purposes of timing, etc. For example, where a pair of pitman assemblies are driven from opposite ends of the same shaft and are used to drive a common plunger or the like, it is important that both of such assemblies be in exactly the same rotative positions at any given point in the operating cycle, any variance causing the plunger to twist and rock during its movement rather than follow a perfectly rectilinear path of travel. If the misalignment becomes great enough, it might be possible for the plunger to jump its tracks and cause serious damage.

But achieving such perfect relationship between opposite ends of a power train such as with cooperating pitman assemblies may be exceedingly difficult as a result o the tolerance buildup which can occur as a result of the multiplicity of components linked together in such a train. Starting at one end of the train and working toward the other, there may simply be so many connections, links, bearings and the like that even though each component may be built well within its acceptable tolerance limits, it may be virtually impossible to assemble those components into a train where they are all perfectly related to one another.

Accordingly, there is a need to be able to adjust the interrelationship of at least two components in the train once the latter has been assembled so as to compensate for any unfavorable tolerance buildup or other factors that would tend to place critical components of the train out of their proper rotative relationships. Complicating the situation, however, is the fact that extraordinary loads may be placed on components of the train during operation so that any adjusting means built into the train must be able to reliably withstand the rigors of severe loading in situations where powerful drive apparatus is required.

Accordingly, one important object of the present invention is to provide a way of making fine adjustments in the rotative or angular relationships between components of a power transmitting mechanism after assembly of the mechanism.

A further important object of this invention is to accomplish the foregoing without sacrificing the ability of the mechanism to withstand severe force loadings incurred in the transmission of high level power.

An additional important object of the present invention is to provide an adjusting arrangement that overcomes the problems inherent in positional adjustment where such adjustment is on an angular or rotative basis rather than on a planar or rectilinear basis.

In the drawing:

FIG. 1 is an elevational view of an exemplary drive train having angular adjustment means in accordance with the principles of the present invention incorporated therein, portions of the train being broken away and shown in cross section to reveal details of construction;

FIG. 2 is a cross-sectional view through the train taken along line 2—2 of FIG. 1;

FIG. 3 is an enlarged, fragmentary cross-sectional view of the adjusting means taken along line 3—3 of FIG. 2; and FIG. 4 is an enlarged, fragmentary view of the adjusting means showing on an exaggerated basis the behavior of components of the adjusting means during adjustment.

The drive train or power transmitting mechanism 10 includes a support 12 having a pair of bearings 14 and 16 at opposite ends thereof that journal a shaft 18. One end of the shaft 18 has a crank arm 20 fixed thereto for rotation therewith, the outermost end 22 of the arm 20 having a pivotal connector 24 that joins the arm 20 with a pitman 26. The opposite end of the shaft 18 has a sprocket wheel member 28 secured thereto for rotation therewith, and a connector 30, disposed eccentrically of the axis of rotation of the shaft 18 to the same extent as the connector 24, pivotally joins the member 28 with a second pitman 32. The pitmans 26 and 32 may in turn be coupled with a plunger (not shown) for reciprocating the latter upon rotation of the shaft 18 through a drive chain 34 that entrains the sprocket member 28.

A hub 36, associated with the sprocket member 28, is held on the shaft 18 against rotation relative thereto by a key 38. Although not illustrated, it is to be understood that the hub 36 is held on the shaft 18 against axial displacement along the latter by any suitable means well-known to those skilled in the art such as, for example, a split retaining ring at the sprocket member 28 end of the shaft 18 seated within an annular recess in the latter on the one hand and abuttingly engaging the proximal outer surface of the hub 36 on the other hand.

An annular, circumferentially extending ledge 40 on the outer face of the hub 36 provides a seat for the sprocket member 28 which has a hole 42 therethrough receiving the annular boss 44 of the hub 36 defined by the recessed nature of the ledge 40. The inner face of the hub 36 (with respect to the longitudinal axis of the shaft 18) is also stepped, presently a second annular ledge 46 surrounding a boss 48 that faces oppositely of the boss 44.

The hub 36 has a circumferential series of apertures 50 therethrough, each of which interconnects the two ledges 40 and 46. The apertures 50 are enlarged with respect to fastening bolts 52 passing therethrough, the bolts 52 also passing through corresponding aligned holes 54 in the sprocket member 28. Nuts 56 threaded onto the outer ends of the bolts 52 seat within bevels 58 about the holes 54 and an annular, appropriately perforated flange plate 60 is clamped between the heads 62 of the bolts 52 and the ledge 46.

The hub 36 also has a crank 64 that is rigidly secured thereto and extends radially outwardly therefrom along the inner face of the sprocket member 28, terminating short of the outer periphery of the latter. The crank 64 in turn is confined between a pair of adjuster assemblies 66 and 68 which, taken jointly with the bolts 52 and their associated structures, may be broadly considered as apparatus for securing the member 28 to the shaft 18 and yet allowing angular adjustment relative to the latter within the plane of rotation of the member 28. Each of the assemblies 66, 68 includes an abutment block 70 rigidly secured to the inner face of the sprocket member 28 by suitable means such as screws 72. A cover plate 74 spans the two blocks 70 covering the crank 68 in spaced relationship thereto and may be held in place by the same screws 72 that fasten the blocks 70 to the sprocket member 28. Each of the assemblies 66, 68 further includes a first component in the nature of a semicircular piece 76 having an arcuate surface 78 that fits into a matingly arcuate surface 80 of a recess 82 in the corresponding side of the crank 64. The engagement of the surfaces 78 and 80 is sliding in nature, as is the engagement of a diametrically extending, rectilinear cam surface 84 on the piece 76 with a correspondingly rectilinear cam surface 86 on a second component of each assembly 66, 68 in the nature of a wedge 88. Each wedge 88 has an apex 90 pointed generally radially inwardly of the sprocket member 28 and formed by the convergence of the cam surface 86 and another surface 92 bearing against the proximal abutment block 70.

While the surface 92 of each wedge 88 extends parallel to and in sliding engagement with the proximal face 94 of block 70, the cam surface 84 extends diagonally of the face 94 so as to push the semicircular piece 76 away from the block 70 or allow the same to be moved closer to the block 70, depending upon the direction of movement of the wedge 88 as governed by an operating screw 96 passing through the block 72 but threaded into a laterally projecting foot 98 at the base of the wedge 88.

In use, it should be apparent from the above description that the crank 64 serves as a structural part of the shaft 18, the abutment blocks 70 become structural parts of the sprocket member 28, and the semicircular pieces 76, the wedges 88 and the screws 96 serve as means between such two structures for effecting relative rotational movement therebetween in response to appropriate turning of the screws 96. Of course, the fastening means in the nature of the bolts 52 must be released during such adjustment, but they need not be completely removed in view of the fact that the apertures 50 are enlarged. Thus, simply backing off the nuts 56 will provide sufficient freedom for the sprocket member 28 to allow it to be rotated slightly upon appropriate manipulation of the adjuster assemblies 66, 68, whereupon retightening of the nuts 56 once again establishes the proper condition of things for operation of the mechanism 10.

FIG. 4 illustrates schematically, and on an exaggerated basis, the types of motions involved when the adjuster assemblies 66, 68 are manipulated. As is apparent, turning a screw 96 in a direction to draw the corresponding wedge 88 in toward the center of the sprocket member 28 will tend to force the corresponding semicircular piece 76 toward the crank 64 and will indeed cause a certin amount of swinging movement thereof (or reactive rotational movement of the sprocket member 28 depending upon which has the greater resistance to movement) if the wedge 88 on the opposite side of the crank 64 has been moved by its screw 96 away from the center of sprocket member 28 so as to allow movement of its semicircular piece 76 away from the crank 64. In other words, the two assemblies 66, 68 must be manipulated oppositely of one another during adjustment so as to cause movement of the crank 64 on the one hand and allow movement of the crank 64 on the other.

In FIG. 4 the solid lines illustrate the initial condition of things before adjustment while the phantom lines show the condition of things following an adjustment. Note that for the assembly 66, the wedge 88 moves toward the center of the sprocket member 28 so that a point on the surface 86 of wedge 88 slides along the surface 84 of semi-circular piece 76 from point X to X'. This has the effect of pushing the semicircular piece 76 leftwardly, thereby swinging the crank 64 clockwise, and the slidable fit between the arcuate surfaces 78 and 80 allows the recess 82 to move slightly about the semicircular piece 76 during such swinging of the crank 64.

On the opposite side of the crank 64 the wedge 88 of assembly 68 has a point on its surface 86 sliding along surface 84 of semicircular piece 76 from point Y to point Y', thereby "backing off" assembly 68 a sufficient amount to accommodate the clockwise swinging of the crank 64. As with the recess 82 for assembly 66, the recess 82 in crank 64 for the assembly 68 slides around the semicircular piece 76 as a result of the sliding engagement between the arcuate surfaces 78 and 80.

Note that the adjusting arrangement hereinabove described is well suited for withstanding heavy loading that might be generated during operation of a power train of this type. The assemblies 66 and 68, being arranged on opposite sides of the crank 64 with respect to the direction of rotation of the latter, are in direct opposition to the direction of force application from the crank 64. This is to be contrasted to the relationship between the bolts 52 and the enlarged apertures 50 which, if relied upon as the means of adjusting the sprocket member 28 and shaft 18 by virtue of having the bolts 52 positionable laterally within the apertures 50, would depend upon the nuts 56 being turned down so tightly that the sprocket member 28 could not slip about the hub 36 and, thus, get out of proper relation therewith. In the case of the assemblies 66, 68, it is only necessary to make certain that the crank 64 is snugly captured between such assemblies following the making of an adjustment, there being no "clamping" action by the assemblies 66, 68 toward the sprocket member 28 and against the crank 64 that could conceivably be overcome by the presence of extraordinary loading in the mechanism 10.

Having thus described the invention, what is claimed as new and desired to be secured by Letters Patent is:

1. Power transmitting mechanism including:
   a shaft rotatable about its longitudinal axis;
   a rotary member; and
   apparatus securing said member to the shaft in a certain angular relationship for rotation with the shaft about said axis while the member and said shaft remain held in said certain angular relationship,
   said apparatus permitting selective angular adjustment of the member relative to the shaft in the plane of rotation of the member to a new angular relationship with the shaft upon temporary termination of said shaft rotation,
   said apparatus including first structure movable with the shaft during said relative adjustment, second structure movable with said member during said relative adjustment, and operating means between said structures for moving the latter relative to one another to effect said adjustment,
   said operating means including a pair of relatively shiftable components having interacting cam surfaces, said components being disposed to impart adjusting force to said first structure when they are relatively shifted in one direction and to relieve adjusting force from said first structure when they are relatively shifted in the opposite direction,
   said operating means further including a second pair of relatively shiftable components having interacting cam surfaces, said second pair of components cooperating with said first mentioned pair of components to confine said first structure therebetween whereby relative shifting of the respective components of the two pairs may be used to effect said adjusting movement of said first structure.

2. A power transmitting assembly as claimed in claim 1, wherein said first structure is provided with a pair of arcuate surfaces on opposite sides thereof, one component of each pair thereof having an arcuate surface in slidable mating engagement with a corresponding arcuate surface on said first structure for accommodating the arcuate nature of said adjusting movement of the first structure.

3. A power transmitting assembly as claimed in claim 2, wherein said second structure includes an abutment for each of said pairs of components respectively, the other components of each pair thereof comprising a wedge between the corresponding abutment and the corresponding said one component.

4. A power transmitting assembly as claimed in claim 3, wherein said operating means further includes a threaded connector between each abutment and its corresponding wedge for operating the wedge.

5. Power transmitting mechanism including:
a shaft rotatable about its longitudinal axis;
a rotary member; and
apparatus securing said member to the shaft in a certain angular relationship for rotation with the shaft about said axis while the member and said shaft remain held in said certain angular relationship,
said apparatus permitting selective angular adjustment of the member relative to the shaft in the plane of rotation of the member to a new angular relationship with the shaft upon temporary termination of said shaft rotation,
said apparatus including a hub secured to said shaft and provided with a crank, releasable means holding the member attached to the hub against rotation relative thereto, and adjuster means between said crank and the member for adjustably swinging the latter relative to the member upon release of said releasable means,
said releasable means including a circumferential series of fasteners about the hub and extending between the latter and said member.

6. A power transmitting assembly as claimed in claim 5, wherein said adjuster means includes a pair of assemblies on opposite sides of said crank capturing the latter therebetween, each of said assemblies having a pair of relatively shiftable components having interacting cam surfaces disposed for effecting said swinging of the crank upon appropriate relative shifting of the components.

7. A power transmitting assembly as claimed in claim 6, wherein said crank is provided with a pair of arcuate surfaces on opposite sides thereof, one component of each assembly having an arcuate surface in slidable mating engagement with a corresponding arcuate surface on said crank for accommodating said swinging thereof during adjustment.

8. A power transmitting assembly as claimed in claim 7, wherein each assembly further includes an abutment fixed to the member, the other component of each pair thereof comprising a wedge between the corresponding abutment and the corresponding said component.

9. A power transmitting assembly as claimed in claim 8, wherein each assembly further includes a threaded connector between each abutment and its corresponding wedge for operating the latter.

* * * * *